US010953755B2

(12) United States Patent
Imanishi (10) Patent No.: US 10,953,755 B2
(45) Date of Patent: Mar. 23, 2021

(54) FUEL CELL UNIT (71) Applicant: TOYOTA JIDOSHA KABUSHIKI KAISHA, Toyota (JP)

(72) Inventor: Masahiro Imanishi, Gotenba (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 255 days.

(21) Appl. No.: 15/915,629

(22) Filed: Mar. 8, 2018

(65) Prior Publication Data
US 2018/0257490 A1  Sep. 13, 2018

(30) Foreign Application Priority Data

Mar. 10, 2017 (JP) .............................. JP2017-045514

(51) Int. Cl.
*H01M 8/00* (2016.01)
*B60L 3/00* (2019.01)
(Continued)

(52) U.S. Cl.
CPC .............. *B60L 3/0053* (2013.01); *B60L 50/72* (2019.02); *H01M 8/04559* (2013.01);
(Continued)

(58) Field of Classification Search
CPC ........ B60L 3/0053; B60L 50/72; B60L 58/30; B60L 53/20; H01M 8/04947;
(Continued)

(56) References Cited

U.S. PATENT DOCUMENTS

2008/0156554 A1    7/2008  Noto
2012/0006607 A1*   1/2012  Ohashi .................... B60K 1/04
                                                        180/65.31
(Continued)

FOREIGN PATENT DOCUMENTS

CN    100521338 C    7/2009
JP    2013-008524    3/2013
(Continued)

*Primary Examiner* — Nicholas P D'Aniello
(74) *Attorney, Agent, or Firm* — Finnegan, Henderson, Farabow, Garrett & Dunner, LLP (57) ABSTRACT

The fuel cell unit includes: a fuel cell stack; a cell monitor configured to detect voltage or current of the fuel cell stack; wire harness configured to connect the fuel cell stack and the cell monitor to each other; a power conversion unit configured to include a switching element and to perform conversion of output power of the fuel cell stack or conversion of supplied power to auxiliary machines used for operation of the fuel cell stack by using the switching element; and a bulkhead part that is made of metal and is configured to partition the wire harness and the power conversion unit from each other, the bulkhead part being grounded, wherein the wire harness and the power conversion unit are placed next to each other with the bulkhead part interposed therebetween. Thus, it becomes implementable to downsize the fuel cell unit while satisfying both the prevention of physical contact between the wire harness and the power conversion unit and the suppression of influences of switching noise on analog data.

14 Claims, 5 Drawing Sheets (51) Int. Cl.

| | |
|---|---|
| *H01M 8/04537* | (2016.01) |
| *H01M 8/1018* | (2016.01) |
| *H01M 8/241* | (2016.01) |
| *H01M 8/04828* | (2016.01) |
| *B60L 50/72* | (2019.01) |
| *H01M 16/00* | (2006.01) |

(52) U.S. Cl.
CPC ... *H01M 8/04589* (2013.01); *H01M 8/04947* (2013.01); *H01M 8/1018* (2013.01); *H01M 8/241* (2013.01); *H01M 16/006* (2013.01); *H01M 2008/1095* (2013.01); *H01M 2250/20* (2013.01); *Y02T 90/40* (2013.01)

(58) Field of Classification Search
CPC ............... H01M 8/241; H01M 8/1018; H01M 8/04589; H01M 8/04559; H01M 2008/1095; H01M 2250/20; H01M 16/006; H01M 8/04582; H01M 8/04552; H01M 8/04; H01M 8/2457; Y02T 90/32; Y02T 90/34
See application file for complete search history.

(56) References Cited

U.S. PATENT DOCUMENTS

2012/0295173 A1* 11/2012 Yamamoto .......... H01M 8/0618
                                                                    429/423
2015/0017563 A1    1/2015 Shirakawa et al.
2017/0358813 A1   12/2017 Imanishi

FOREIGN PATENT DOCUMENTS

| JP | 2013-180643 A   | 9/2013  |
| JP | 2014-151664     | 8/2014  |
| JP | 2016-167463     | 9/2016  |
| JP | 2017-224403     | 12/2017 |
| WO | WO2006/090922 A1 | 8/2006 |

\* cited by examiner

FUEL CELL UNIT

CROSS-REFERENCE TO RELATED APPLICATIONS

The present application claims priority from Japanese patent application 2017-45514 filed on Mar. 10, 2017, the entirety of the content of which is hereby incorporated by reference into this application.

BACKGROUND

Field

The present disclosure relates to a fuel cell unit.

Related Art

There has been provided a fuel cell unit which includes a fuel cell stack, and an electric power conversion unit having a switching element to perform switching operation at high frequency. The electric power conversion unit is exemplified by fuel cell-dedicated converters for conversion of output power of a fuel cell stack, auxiliary machine-dedicated inverters for conversion of supplied power to auxiliary machines used for operation of the fuel cell stack, and the like.

On a fuel cell vehicle of JP 2014-151664 A, a fuel cell unit including a fuel cell stack and a power conversion unit is mounted. With regard to such a fuel cell vehicle, the present inventor has found the following existing problems involved in downsizing the fuel cell unit. That is, because wire harness for connection between a cell monitor, which detects voltage or current of the fuel cell stack, and the fuel cell stack is placed in adjacency to the power conversion unit, vibrations of the vehicle may cause the wire harness to be put into physical contact with the power conversion unit and thereby damaged, or analog data transferred via the wire harness are affected by switching noise developed in the power conversion unit. With a view to solving such problems, there is a desire for a technique capable of downsizing the fuel cell unit while satisfying both prevention of the physical contact between the wire harness and the power conversion unit and suppression of influences of the switching noise on the analog data.

SUMMARY

In one aspect of the present disclosure, there is provided a fuel cell unit. The fuel cell unit includes: a fuel cell stack; a cell monitor configured to detect voltage or current of the fuel cell stack; wire harness configured to connect the fuel cell stack and the cell monitor to each other; a power conversion unit configured to include a switching element and to perform conversion of output power of the fuel cell stack or conversion of supplied power to auxiliary machines used for operation of the fuel cell stack by using the switching element; and a bulkhead part that is made of metal and is configured to partition the wire harness and the power conversion unit from each other, the bulkhead part being grounded, wherein the wire harness and the power conversion unit are placed next to each other with the bulkhead part interposed therebetween.

DETAILED DESCRIPTION

A. First Embodiment

Figure 1:
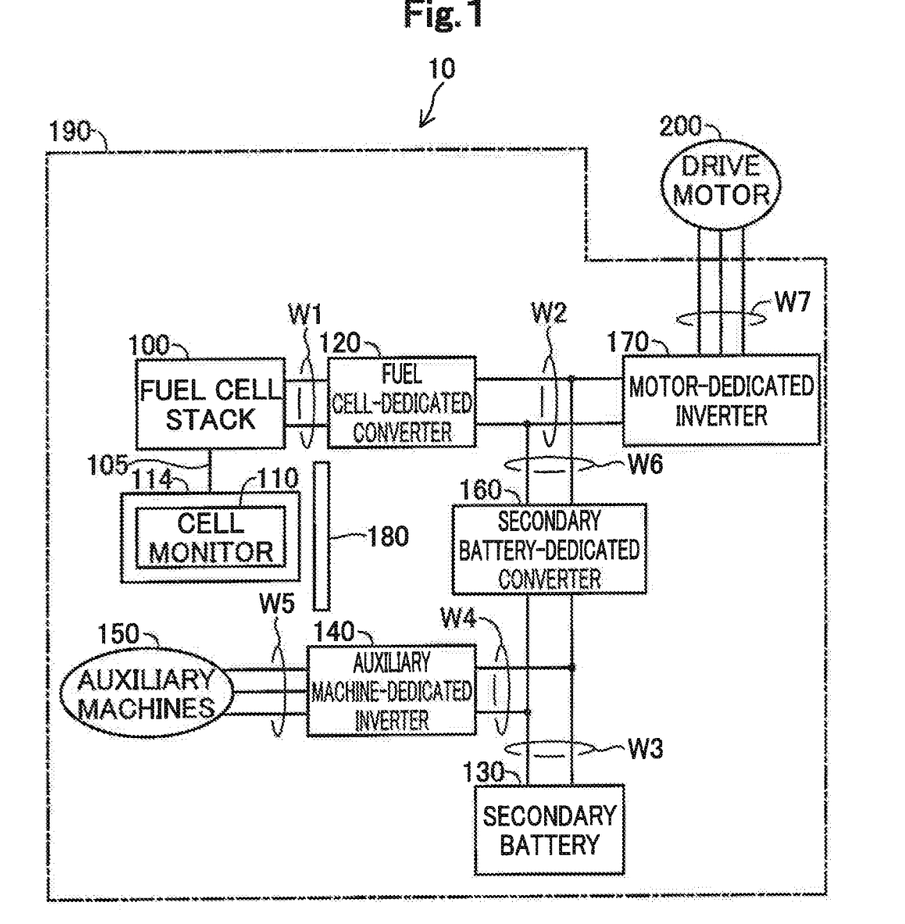
FIG. 1 is a block diagram showing an outline configuration of a fuel cell unit.

FIG. 1 is a block diagram showing an outline configuration of a fuel cell unit 10 in a first embodiment of the present disclosure. The fuel cell unit 10 is mounted as a power source for a vehicle driven by a drive motor 200. The fuel cell unit 10 includes a fuel cell stack 100, wire harness 105, a cell monitor 110, a cell monitor casing 114, a fuel cell-dedicated converter 120, a secondary battery 130, an auxiliary machine-dedicated inverter 140, auxiliary machines 150, a secondary battery-dedicated converter 160, a motor-dedicated inverter 170, a bulkhead part 180, and a housing 190. The fuel cell unit 10 further includes a DC lead wire W1, a DC lead wire W2, a DC lead wire W3, a DC lead wire W4, an AC lead wire W5, a DC lead wire W6, and an AC lead wire W7.

The fuel cell stack 100 is a unit that generates electric power through electrochemical reactions of hydrogen and oxygen. The fuel cell stack 100 is formed by stacking a plurality of unit cells together. Each of the unit cells, being a power generation element capable of power generation alone, includes a membrane-electrode gas-diffusion-layer assembly in which gas diffusion layers are provided on both sides of a membrane electrode assembly having an electrolyte membrane, and separators placed on both outer sides of the membrane-electrode gas-diffusion-layer assembly. The electrolyte membrane is formed of a solid polymer thin film exhibiting successful proton conductivity in a wet state internally containing water content. The fuel cell stack 100, although allowing various types to be applied thereto, is provided by the solid polymer type in this embodiment. The fuel cell stack 100 is electrically connected to the cell monitor 110 via the wire harness 105 formed of a bundle of plural cables. Also, the fuel cell stack 100 is electrically connected to the fuel cell-dedicated converter 120 via the DC lead wire W1.

The cell monitor 110 is a monitor for detecting voltage or current of cells constituting the fuel cell stack 100. Analog data measured in the fuel cell stack 100 are transferred to the cell monitor 110 via the wire harness 105.

The cell monitor casing 114, which is made of iron, houses therein the cell monitor 110 in a state that a connector (later-described connector 112) by which the cell monitor 110 is connected with the wire harness 105 is exposed outside. In this embodiment, the connector 112 corresponds to a subordinate concept of the first connector in the section of SUMMARY.

The fuel cell-dedicated converter 120, which is a step-up type converter device, performs step-up operation of stepping up an output voltage of the fuel cell stack 100 to a target voltage. The fuel cell-dedicated converter 120, having a reactor and a switching element which are unshown, performs electrical conduction control to the reactor by using the switching element. Magnetic energy accumulated on the reactor with the switching element on is transformed into an induction voltage with the switching element off, and then outputted in superimposition on the output voltage of the fuel cell stack 100, allowing voltage step-up to be fulfilled. Thus, the fuel cell-dedicated converter 120 performs switching for conversion of the output power of the fuel cell stack 100. The fuel cell-dedicated converter 120 is electrically connected to the motor-dedicated inverter 170 via the DC lead wire W2.

The secondary battery 130 functions as a power source of the fuel cell unit 10 together with the fuel cell stack 100. In this embodiment, the secondary battery 130 is formed of a lithium ion battery. In other embodiments, the secondary battery 130 may be another type of battery such as lead storage battery, nickel-cadmium battery, and nickel hydrogen battery. The secondary battery 130 is electrically connected to the secondary battery-dedicated converter 160 via the DC lead wire W3.

The auxiliary machine-dedicated inverter 140 is electrically connected via the DC lead wire W4 to the DC lead wire W3 that connects the secondary battery 130 and the secondary battery-dedicated converter 160 to each other. The auxiliary machine-dedicated inverter 140 converts electric power supplied in direct current from the secondary battery 130 via the DC lead wire W3 and the DC lead wire W4 into electric power of three-phase alternating current. The auxiliary machine-dedicated inverter 140, having an unshown switching element, performs PWM control over the switching element to convert DC voltage into AC voltage. Thus, the auxiliary machine-dedicated inverter 140 performs switching for conversion of supplied power to the auxiliary machines 150. The auxiliary machine-dedicated inverter 140 is electrically connected to the auxiliary machines 150 via the AC lead wire W5 to supply the three-phase AC power to the auxiliary machines 150.

In this embodiment, the fuel cell-dedicated converter 120 and the auxiliary machine-dedicated inverter 140 correspond to a subordinate concept of the power conversion unit in the section of SUMMARY.

The auxiliary machines 150 are auxiliary machines which are used for operation of the fuel cell stack 100. The auxiliary machines 150 include, for example, an air compressor for supplying air as cathode gas to the fuel cell stack 100, a hydrogen circulation pump for circulating hydrogen as anode gas, a cooling device for cooling the fuel cell stack 100, a humidifying device for humidifying gas supplied to the fuel cell stack 100, and the like.

The secondary battery-dedicated converter 160, which is a step-up/down type converter device, is similar in configuration to the fuel cell-dedicated converter 120. The secondary battery-dedicated converter 160 is electrically connected via the DC lead wire W6 to the DC lead wire W2 that connects the fuel cell-dedicated converter 120 and the motor-dedicated inverter 170 to each other. The secondary battery-dedicated converter 160 regulates voltage in the DC lead wire W2, which is input voltage of the motor-dedicated inverter 170, to control charging/discharging of the secondary battery 130.

When the output power from the fuel cell-dedicated converter 120 is insufficient for a target output power, the secondary battery-dedicated converter 160 makes the secondary battery 130 discharge. Meanwhile, when regenerative power is generated in the drive motor 200, the secondary battery-dedicated converter 160 converts the regenerative power adaptively for storage in the secondary battery 130. Also, the secondary battery-dedicated converter 160 may convert the output power of the fuel cell stack 100 adaptively for storage in the secondary battery 130. In addition, the secondary battery-dedicated converter 160 may be dissimilar in configuration from the fuel cell-dedicated converter 120.

The motor-dedicated inverter 170 converts electric power, which is supplied in direct current from the fuel cell stack 100 and the secondary battery 130 via the DC lead wire W2, into electric power of three-phase alternating current. The motor-dedicated inverter 170 is electrically connected to the drive motor 200 via the AC lead wire W7 to supply three-phase AC power to the drive motor 200. Also, the motor-dedicated inverter 170 converts regenerative power generated in the drive motor 200 into DC power and outputs the DC power to the DC lead wire W2.

The bulkhead part 180 is a metallic plate-shaped member. Detailed configuration of The bulkhead part 180 will be described with reference to FIG. 2.

The housing 190 houses therein the fuel cell stack 100, the wire harness 105, the cell monitor 110, the cell monitor casing 114, the fuel cell-dedicated converter 120, the secondary battery 130, the auxiliary machine-dedicated inverter 140, the auxiliary machines 150, the secondary battery-dedicated converter 160, the motor-dedicated inverter 170, and the bulkhead part 180. The housing 190 is made of aluminum. The housing 190 is fixed to the vehicle.

The drive motor 200 is an electric motor for converting three-phase AC power supplied from the motor-dedicated inverter 170 into rotational power.

Figure 2:
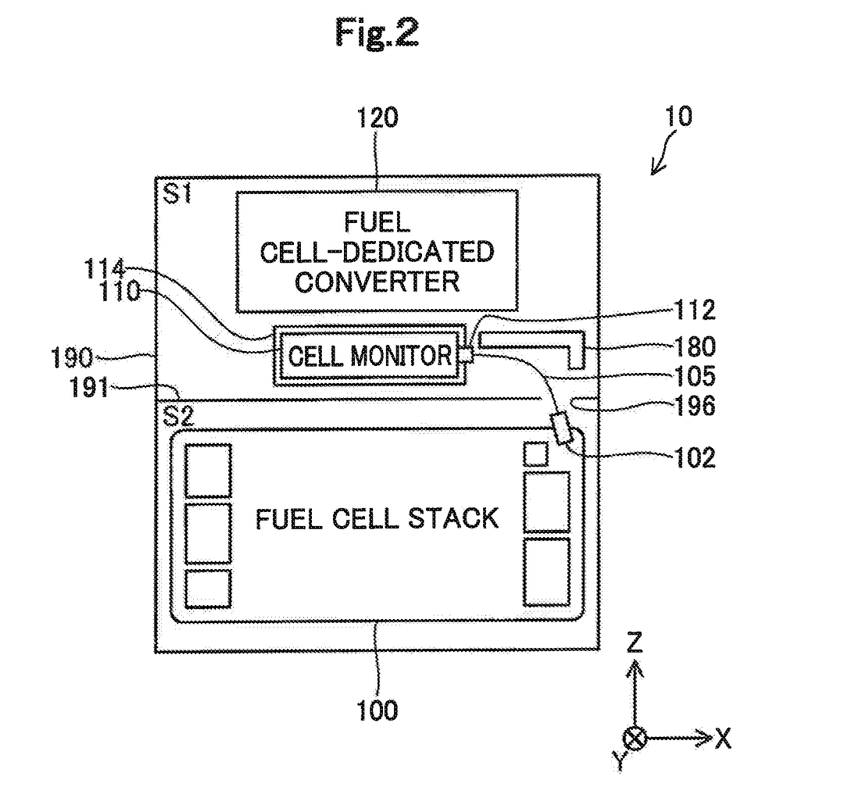
FIG. 2 is a conceptual diagram showing a layout configuration of the fuel cell unit.

FIG. 2 is a conceptual diagram showing a layout configuration of the fuel cell unit 10 in the first embodiment. In FIG. 2, X, Y and Z axes perpendicular to one another are depicted. The X, Y and Z axes in FIG. 2 correspond to X, Y and Z axes in other figures. In FIG. 2, for explanation's sake, shown out of the fuel cell unit 10 are the fuel cell stack 100, the wire harness 105, the cell monitor 110, the cell monitor casing 114, the fuel cell-dedicated converter 120, the bulkhead part 180, and the housing 190. The other constituent members of the fuel cell unit 10 are omitted in depiction and description.

A partition 191 extending along the X axis direction is provided at a site rather closer to a center in the Z axis direction, by which interior of the housing 190 is divided into a space S1 on the +Z axis direction side and a space S2 on the −Z axis direction side. Placed in the space S1 are the cell monitor 110, the cell monitor casing 114, the fuel cell-dedicated converter 120, and the bulkhead part 180. The fuel cell stack 100 is placed in the space S2. The partition 191 has an opening 196 that allows the space S1 and the space S2 to communicate with each other.

The wire harness 105 is so provided as to pass through the opening 196 and be laid out outside the cell monitor casing 114. The wire harness 105 connects the fuel cell stack 100 and the cell monitor 110 to each other via a connector 102 on the fuel cell stack 100 side and a connector 112 on the cell monitor 110 side. In this embodiment, the connector 102 corresponds to a subordinate concept of the second connector in the section of SUMMARY.

The bulkhead part 180 partitions the wire harness 105 and the fuel cell-dedicated converter 120 from each other. The bulkhead part 180 is an iron plate-shaped member extending along the Y axis direction. The wire harness 105 and the fuel cell-dedicated converter 120 are placed next to each other with the bulkhead part 180 interposed therebetween. The terms, "placed next to each other with the bulkhead part 180 interposed therebetween," include, for example, an aspect in which only the bulkhead part 180 is provided between the wire harness 105 and the fuel cell-dedicated converter 120. The bulkhead part 180 is placed on the +X axis direction side of the cell monitor 110 and moreover on the +Z axis direction side of the wire harness 105. In this embodiment, the bulkhead part 180 is fixed to a wall surface of the housing 190. Since the housing 190 made of aluminum is fixed to the vehicle, the bulkhead part 180 is grounded to the vehicle body via the housing 190. With this arrangement, switching noise absorbed to the bulkhead part 180 can be absorbed to the vehicle body through the bulkhead part 180. Also, since the bulkhead part 180 can be simplified in terms of its grounding structure as compared with a structure involving provision of the grounding wire for direct connection to the bulkhead part, the manufacturing cost can be suppressed lower.

According to the embodiment described hereinabove, the wire harness 105 and the fuel cell-dedicated converter 120 are partitioned from each other by the bulkhead part 180, so that physical contact between the wire harness 105 and the fuel cell-dedicated converter 120 can be prevented. Also, the bulkhead part 180, which is made of iron, is enabled to reflect or absorb switching noise, which occurs due to switching of the fuel cell-dedicated converter 120, and allow the switching noise to escape to the ground. As a result of this, analog data transferred from the fuel cell stack 100 to the cell monitor 110 via the wire harness 105 can be made less affected by switching noise. Accordingly, it becomes allowable to lay out the wire harness 105 and the fuel cell-dedicated converter 120 at nearer positions, so that downsizing of the fuel cell unit 10 can be realized. Thus, it becomes implementable to downsize the fuel cell unit 10 while satisfying both the prevention of physical contact between the wire harness 105 and the fuel cell-dedicated converter 120 and the suppression of influences of switching noise on analog data.

With a mode in which a common resin-made protective member is wound on the wire harness 105 to prevent physical contact between the wire harness 105 and the fuel cell-dedicated converter 120, it is impossible to prevent up to the influences of switching noise on analog data. Also, with another mode in which a protective member equipped with a noise canceling function is wound on the wire harness 105, there is a problem that such a protective member is high-priced. Further, with another mode in which these protective members are wound on the wire harness 105, there is a need for providing even an abrasion-resistant protective tape and an abrasion-resistant tube. On the other hand, in the first embodiment, the provision of the bulkhead part 180 makes it possible to satisfy both the prevention of physical contact between the wire harness 105 and the fuel cell-dedicated converter 120 and the suppression of influences of switching noise on analog data while the configuration is kept low-priced as compared with the protective member equipped with the noise canceling function. Also in the first embodiment, there is no need for providing even an abrasion-resistant protective tape and an abrasion-resistant tube, and wire harness 105 with a common resin-made protective member wound thereon may be used. Further, when a plurality of bundles of wire harness 105 are involved, a low-cost member such as vinyl tape may be used to combine the plurality of bundles of wire harness 105 together.

Also, the fuel cell unit 10 of the first embodiment is high in the degree of freedom for layout of the wire harness 105 in the fuel cell unit 10. More specifically, even when the wire harness 105 is placed on one side of the cell monitor 110 facing the fuel cell-dedicated converter 120, influences of switching noise can be reduced by the bulkhead part 180. Accordingly, there is no need for placing the wire harness 105 on one side of the cell monitor 110 opposed to its side facing the fuel cell-dedicated converter 120. Thus, there results a high degree of freedom for layout of the wire harness 105 in the fuel cell unit 10.

With the fuel cell unit 10 of the first embodiment, the bulkhead part 180 partitions the wire harness 105 and the fuel cell-dedicated converter 120 from each other. Therefore, the wire harness 105, which is provided outside the cell monitor casing 114, and the fuel cell-dedicated converter 120 can be prevented from making physical contact with each other. Also, layout work of the wire harness 105 can be carried out with the cell monitor 110 housed in the cell monitor casing 114, so that improvement of the workability and suppression of damage to the cell monitor 110 during the work can be fulfilled.

B. Second Embodiment

Figure 3:
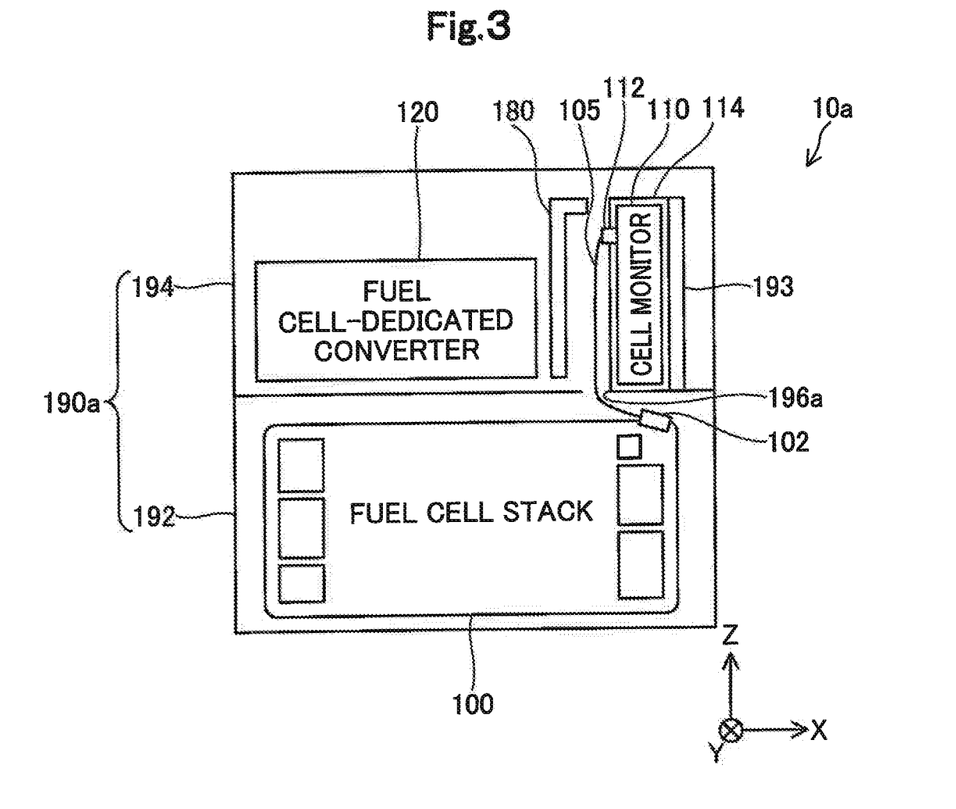
FIG. 3 is a conceptual diagram showing a layout configuration of the fuel cell unit.

FIG. 3 is a conceptual diagram showing a layout configuration of a fuel cell unit 10*a* according to a second embodiment. The fuel cell unit 10*a* is similar in configuration to the fuel cell unit 10 of the first embodiment except that the fuel cell unit 10*a* includes a housing 190*a* different from the housing 190 of the first embodiment, and that layout configuration of the fuel cell unit 10*a* differs from the layout configuration of the fuel cell unit 10. Therefore, like component members are designated by like reference signs and their detailed description is omitted. For explanation's sake, shown in FIG. 3 are the fuel cell stack 100, the wire harness 105, the cell monitor 110, the cell monitor casing 114, the fuel cell-dedicated converter 120, the bulkhead part 180, a housing 190*a*, and a bracket 193 while other constituent members of the fuel cell unit 10*a* are omitted in depiction and description.

The fuel cell unit 10*a* of the second embodiment has a configuration in which a first subunit 192 and a second subunit 194 are assembled to each other along the Z axis direction. Detailed configuration of the first subunit 192 and the second subunit 194 will be described later.

The housing 190*a* houses therein individual constituent members of the fuel cell unit 10*a*. The housing 190*a* is made of aluminum. The housing 190*a* is composed of an outer shell of the first subunit 192, and an outer shell of the second subunit 194. The first subunit 192 and the second subunit 194 are connected and integrated together, by which the housing 190*a* is made up.

Figure 4:
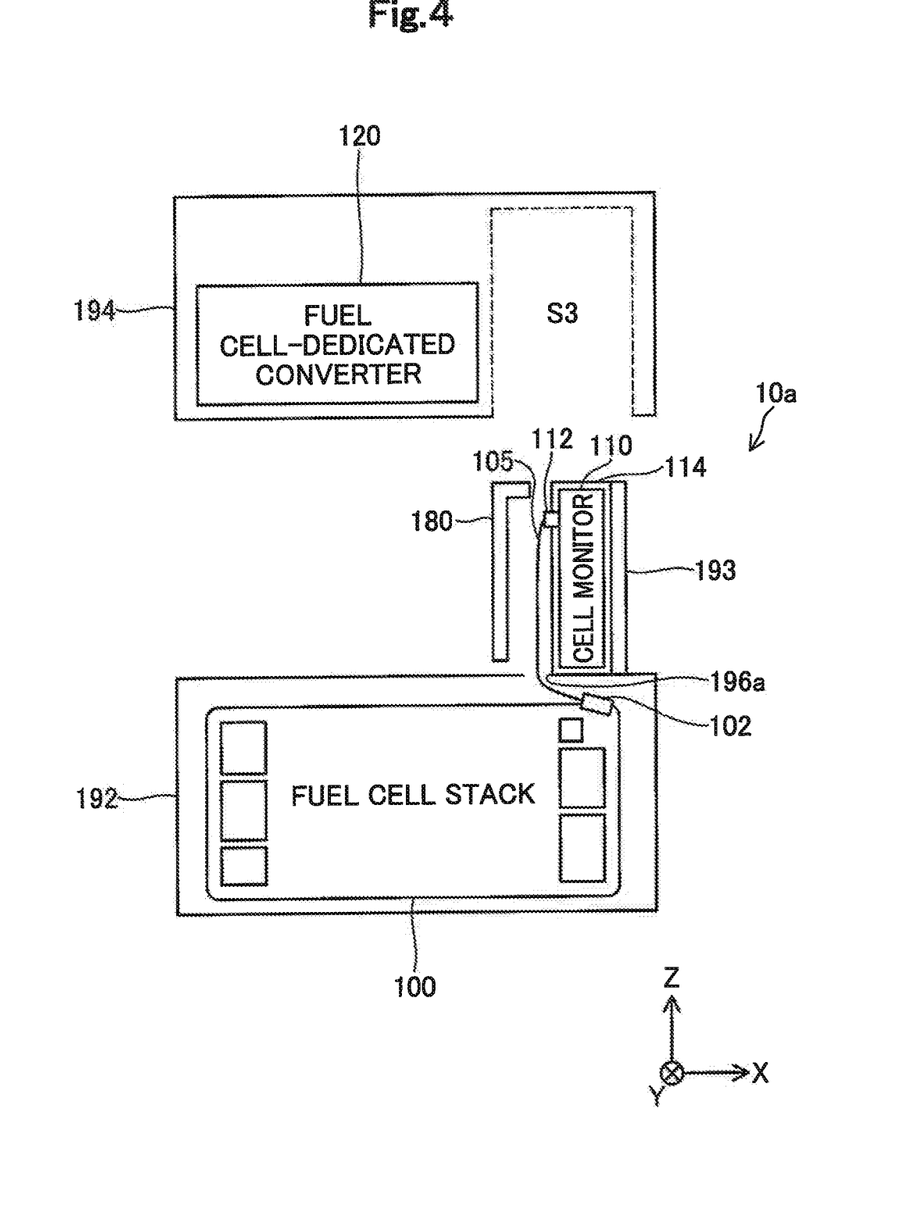
FIG. 4 is an explanatory view showing a state before the first subunit and the second subunit are integrated together.

FIG. 4 is an explanatory view showing a state before the first subunit 192 and the second subunit 194 are integrated together. The housing 190*a* is made up as the second subunit 194 is connected to the first subunit 192 from the +Z axis direction side. The state of FIG. 3 is a state in which the housing 190*a* has been made up.

The first subunit 192 includes the fuel cell stack 100, the cell monitor 110, and the cell monitor casing 114. The cell monitor 110 and the cell monitor casing 114 are placed so as to be projected toward the +Z axis direction side. The cell monitor casing 114 has the cell monitor 110 housed therein so that the connector 112 is positioned on the +Z axis direction side in the cell monitor 110, while the cell monitor casing 114 is fixed to the first subunit 192 via the iron bracket 193. The bracket 193 is a component member independent of the first subunit 192. In this embodiment, the cell monitor 110 is housed in the cell monitor casing 114 so that the connector 112 is placed so as to face the −X axis direction side. In this embodiment, the +Z axis direction corresponds to a subordinate concept of the first direction in the section of SUMMARY.

The second subunit 194 includes the fuel cell-dedicated converter 120, the secondary battery 130, the auxiliary machine-dedicated inverter 140, the auxiliary machines 150, the secondary battery-dedicated converter 160, and the motor-dedicated inverter 170. It is noted that only the fuel cell-dedicated converter 120 out of the constituent members included in the second subunit 194 is depicted for explanation's sake. The second subunit 194, while positioned on the +Z axis direction side of the first subunit 192, is connected to the first subunit 192 so as to be integrated together. Also, a housing space S3 is formed in the second subunit 194. When the second subunit 194 is integrated with the first subunit 192, part of the wire harness 105, the cell monitor 110, the cell monitor casing 114, the bulkhead part 180, the bracket 193 and the like are housed in the housing space S3.

The wire harness 105 is laid out outside the cell monitor casing 114 while passing through an opening 196a provided in the first subunit 192. The wire harness 105 connects the connector 102 on the fuel cell stack 100 side and the connector 112 on the cell monitor 110 side to each other.

Figure 5:
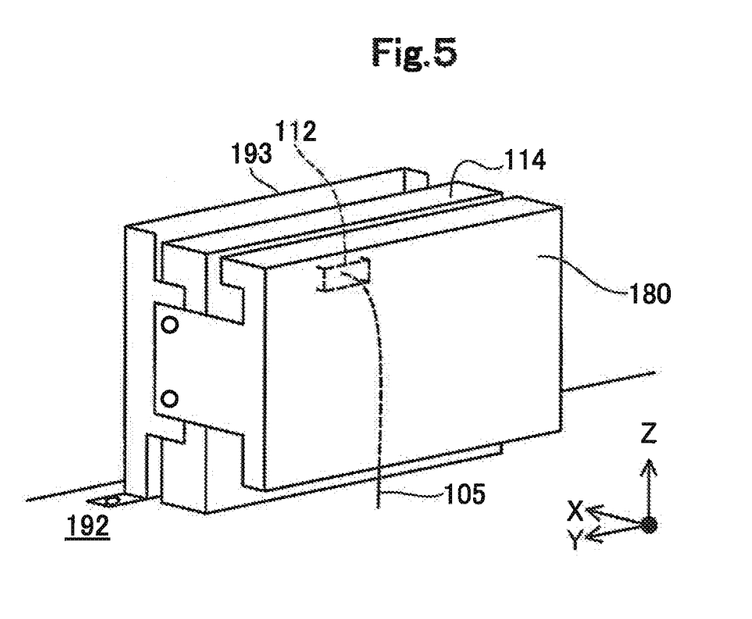
FIG. 5 is a perspective view showing a cell monitor casing and a bulkhead part.

FIG. 5 is a perspective view showing the cell monitor casing 114 and the bulkhead part 180. For an easier understanding, only the wire harness 105, the connector 112, the cell monitor casing 114, the bulkhead part 180, the first subunit 192, and the bracket 193 are Shown in FIG. 5.

The bulkhead part 180 is fixed to the first subunit 192 via the bracket 193. The bulkhead part 180 covers the wire harness 105, which is provided in the housing space S3, from the −X axis direction side, i.e., from the side on which the fuel cell-dedicated converter 120 is placed. In the state in which the housing 190a is made up, the wire harness 105 and the fuel cell-dedicated converter 120 are placed next to each other with the bulkhead part 180 interposed therebetween.

The fuel cell unit 10a configured as described above has the same effects as the fuel cell unit 10 of the first embodiment. By virtue of the arrangement that one side of the wire harness 105 on which the fuel cell-dedicated converter 120 is provided is covered with the bulkhead part 180, when the first subunit 192 and the second subunit 194 are connected and integrated together (on transition from the state of FIG. 4 to the state of FIG. 3), the wire harness 105 can be prevented from making physical contact with, as well as suffering resultant damage, the fuel cell-dedicated converter 120 by insertion of the cell monitor casing 114 or the like into the housing space S3 or by positional adjustment after the insertion or the like.

C. Modifications

C1. Modification 1

In the individual embodiments, the bulkhead part 180 partitions the fuel cell-dedicated converter 120 and the wire harness 105 from each other. However, the disclosure is not limited to this. For example, the bulkhead part 180 may partition the auxiliary machine-dedicated inverter 140 and the wire harness 105 from each other. That is, the bulkhead part 180 may partition the power conversion unit and the wire harness 105 from each other, where the power conversion unit generally has a switching element and, by using the switching element, performs conversion of output power of the fuel cell stack 100 or conversion of supplied power to the auxiliary machines 150 used for operation of the fuel cell stack 100. Moreover, without being limited to the auxiliary machine-dedicated inverter 140, the bulkhead part 180 may partition the wire harness 105 and at least one of the secondary battery-dedicated converter 160 and the motor-dedicated inverter 170 from each other. That is, the bulkhead part 180 may partition the power conversion unit and the wire harness 105 from each other, where the power conversion unit has a switching element and, by using the switching element, performs conversion of output power of the secondary battery 130 and electric power outputted from the fuel cell stack 100 for charging of the secondary battery 130 or conversion of electric power supplied from the fuel cell stack 100 and the secondary battery 130 to the drive motor 200. The bulkhead part 180 may partition the power conversion unit, which performs conversion of electric power by using the switching element, out of the fuel cell unit 10 and the wire harness 105 from each other.

C2. Modification 2

Although the fuel cell unit 10 is mounted on a vehicle in the first embodiment, yet the disclosure is not limited to this. For example, the fuel cell unit 10 may be mounted on a vessel or installed in a house. In such a case, the bulkhead part is grounded to the hull of the vessel or to the ground.

C. Modification 3

Although the cell monitor 110 is housed in the cell monitor casing 114 in the individual embodiments, the disclosure is not limited to this. For example, the cell monitor 110 may be other than housed in the cell monitor casing 114.

C4. Modification 4

Although the bracket 193 is a component member independent of the first subunit 192 in the second embodiment, the disclosure is not limited to this. For example, the bracket 193 may be formed by part of the first subunit 192 projected toward the +Z axis direction side.

C5. Modification 5

Although the cell monitor 110, in the second embodiment, is housed in the cell monitor casing 114 so that the connector 112 is placed so as to face the −X axis direction side, yet the disclosure is not limited to this. For example, the cell monitor 110 may be housed in the cell monitor casing 114 so that the connector 112 is placed so as to face the +X axis direction side, or that the connector 112 is placed so as to face the +Z axis direction side.

The disclosure is not limited to any of the embodiment and its modifications described above but may be implemented by a diversity of configurations without departing from the scope of the disclosure. For example, the technical features of any of the embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

In one aspect of the present disclosure, there is provided a fuel cell unit. The fuel cell unit includes: a fuel cell stack; a cell monitor configured to detect voltage or current of the fuel cell stack; wire harness configured to connect the fuel cell stack and the cell monitor to each other; a power conversion unit configured to include a switching element and to perform conversion of output power of the fuel cell stack or conversion of supplied power to auxiliary machines used for operation of the fuel cell stack by using the switching element; and a bulkhead part that is made of metal and is configured to partition the wire harness and the power conversion unit from each other, the bulkhead part being grounded, wherein the wire harness and the power conversion unit are placed next to each other with the bulkhead part interposed therebetween. According to this aspect, by the bulkhead part partitioning the wire harness and the power conversion unit from each other, physical contact between the wire harness and the power conversion unit can be prevented. Also, since the metallic bulkhead part is enabled to reflect or absorb switching noise and allow the switching noise to escape to the ground, influences of switching noise on analog data can be suppressed. Accordingly, it becomes allowable to lay out the wire harness and the power conversion unit at nearer positions, so that downsizing of the fuel cell unit can be realized. Thus, it becomes implementable to downsize the fuel cell unit while satisfying both the prevention of physical contact between the wire harness and the power conversion unit and the suppression of influences of switching noise on analog data.

In the above-described aspect, the fuel cell unit may be mounted on a vehicle, and the bulkhead part may be grounded via a body of the vehicle. According to this aspect, switching noise absorbed to the bulkhead part can be absorbed to the vehicle body. Also, since the bulkhead part can be simplified in terms of its grounding structure as compared with a structure involving provision of the grounding wire for direct connection to the bulkhead part, the manufacturing cost can be suppressed lower.

In the above-described aspect, the fuel cell unit may further include a cell monitor casing that is made of metal and is configured to house the cell monitor in a state that a first connector for connection of the cell monitor to the wire harness is exposed outside, wherein the fuel cell stack may include a second connector for connection of the fuel cell stack to the wire harness, and the wire harness may be laid out outside the cell monitor casing, and is connected to the first connector and the second connector, to connect the fuel cell stack and the cell monitor each other. According to this aspect, even though the wire harness is provided outside the cell monitor casing, physical contact between the wire harness and the power conversion unit can be prevented by the bulkhead part. Also, layout work of the wire harness can be carried out with the cell monitor housed in the cell monitor casing, so that improvement of the workability and suppression of damage to the cell monitor during the work can be fulfilled.

In the above-described aspect, the fuel cell unit may further include: a first subunit including the fuel cell stack, the cell monitor, the cell monitor casing and the bulkhead part, and being placed so that the cell monitor and the cell monitor casing are projected toward a first direction; and a second subunit including the power conversion unit and being positioned on a first direction side of the first subunit and being connected and integrated together with the first subunit, the second subunit including a housing space formed therein for housing of the cell monitor, the cell monitor casing, and the bulkhead part, wherein the cell monitor casing may house the cell monitor so that the first connector is positioned on the first direction side in the cell monitor, and is fixed to the first subunit via a bracket, at least part of the wire harness may be laid out in the housing space, and the bulkhead part may be fixed to the first subunit via the bracket so as to cover the wire harness laid out in the housing space from the power conversion unit-side. According to this aspect, one side of the wire harness on which the power conversion unit is placed is covered with the bulkhead part. Therefore, when the first subunit and the second subunit are connected and integrated together, the wire harness can be prevented from making physical contact with the power conversion unit as well as being thereby damaged.

The present disclosure is not limited in mode to the fuel cell unit, and may be applied to various modes such as vehicles on which the fuel cell unit is mounted and methods for manufacturing the fuel cell unit. Also, the disclosure, being in no sense limited to the foregoing aspects, may of course be implemented in various modes within a scope not departing from the gist of the disclosure.

What is claimed is:

1. A fuel cell unit comprising:
    a fuel cell stack;
    a cell monitor configured t o detect voltage or current of the fuel cell stack;
    a wire harness configured to connect the fuel cell stack and the cell monitor to each other;
    a power conversion unit configured to include a switching element and to perform conversion of output power of the fuel cell stack or conversion of supplied power to auxiliary machines used for operation of the fuel cell stack by using the switching element;
    a housing configured to house therein the fuel cell stack, the cell monitor, and the power conversion unit; and
    a bulkhead part that is made of metal and is configured to partition the wire harness and the power conversion unit from each other, the bulkhead part being grounded, wherein
    the fuel cell unit is mounted on an object,
    the housing is fixed to the object on which the fuel cell unit is mounted,
    the wire harness and the power conversion unit are placed next to each other with the bulkhead part interposed therebetween,
    the housing is configured to have four walls and an interior space surrounded by the four walls, and
    the fuel cell stack, the cell monitor, the wire harness, the power conversion unit, and the bulkhead part are disposed in the interior space of the housing.

2. The fuel cell unit in accordance with claim 1, wherein the object on which the fuel cell unit is mounted is a vehicle, and the bulkhead part is grounded via a body of the vehicle.

3. The fuel cell unit in accordance with claim 1, further comprising
    a cell monitor casing that is made of metal and is configured to house the cell monitor in a state that a first connector for connection of the cell monitor to the wire harness is exposed outside, wherein
    the fuel cell stack includes a second connector for connection of the fuel cell stack to the wire harness, and
    the wire harness is laid out outside the cell monitor casing, and is connected to the first connector and the second connector, to connect the fuel cell stack and the cell monitor each other.

4. The fuel cell unit in accordance with claim 3, further comprising:
    a first subunit including the fuel cell stack, the cell monitor, the cell monitor casing and the bulkhead part, and being placed so that the cell monitor and the cell monitor casing are projected toward a first direction; and
    a second subunit including the power conversion unit and being positioned on a first direction side of the first subunit and being connected and integrated together with the first subunit, the second subunit including a housing space formed therein for receiving the cell monitor, the cell monitor casing, and the bulkhead part at least partially therein, wherein the housing is composed of an outer shell of the first subunit, and an outer shell of the second subunit, the cell monitor casing houses the cell monitor so that the first connector is positioned on the first direction side in the cell monitor, and is fixed to the first subunit via a bracket, at least part of the wire harness is laid out in the housing space, and the bulkhead part is fixed to the first subunit via the bracket so as to cover the wire harness laid out in the housing space from the power conversion unit-side.

5. The fuel cell unit in accordance with claim 3, wherein the housing is configured to house therein the cell monitor casing.

6. The fuel cell unit in accordance with claim 1, wherein
the housing is provided with a partition that divides the interior space of the housing into a first space in which the fuel cell stack is housed, and a second space in which the cell monitor is housed, the partition of the housing including an opening, and the fuel cell stack and the cell monitor are connected by the wire harness passing through the opening in the partition.

7. The fuel cell unit in accordance with claim 1, wherein the cell monitor is spaced in a first direction from the fuel cell stack, and the bulkhead part is spaced in the first direction from the wire harness.

8. The fuel cell unit in accordance with claim 1, wherein the cell monitor is spaced in a first direction from the fuel cell stack, and the bulkhead part is spaced in between the wire harness and power conversion unit along a second direction that is perpendicular to the first direction.

9. A fuel cell unit comprising:
a fuel cell stack;
a cell monitor configured to detect voltage or current of the fuel cell stack;
a wire harness configured to connect the fuel cell stack and the cell monitor to each other;
a power conversion unit configured to include a switching element and to perform conversion of output power of the fuel cell stack or conversion of supplied power to auxiliary machines used for operation of the fuel cell stack by using the switching element;
a housing configured to house therein the fuel cell stack, the cell monitor, and the power conversion unit, wherein the housing is configured to have four walls and an interior space surrounded by the four walls and wherein the housing is provided with a partition that divides the interior space into a first space in which the fuel cell stack is housed, and a second space in which the cell monitor is housed; and
a bulkhead part that is made of metal and is configured to partition the wire harness and the power conversion unit from each other, the bulkhead part being grounded, wherein
a drive motor configured to generate drive power is situated outside of the housing,
the wire harness and the power conversion unit are placed next to each other with the bulkhead part interposed therebetween,
the partition of the housing includes an opening, the fuel cell stack and the cell monitor are connected by the wire harness passing through the opening in the partition, and the fuel cell stack, the cell monitor, the wire harness, the power conversion unit, and the bulkhead part are disposed in the interior space of the housing.

10. The fuel cell unit in accordance with claim 9, wherein the cell monitor is spaced in a first direction from the fuel cell stack, and the bulkhead part is spaced in the first direction from the wire harness.

11. The fuel cell unit in accordance with claim 9, wherein the cell monitor is spaced in a first direction from the fuel cell stack, and the bulkhead part is spaced in between the wire harness and power conversion unit along a second direction that is perpendicular to the first direction.

12. A fuel cell unit comprising:
a fuel cell stack;
a cell monitor configured to detect voltage or current of the fuel cell stack;
a wire harness configured to connect the fuel cell stack and the cell monitor to each other;
a cell monitor casing that is made of metal and is configured to house the cell monitor in a state that a first connector for connection of the cell monitor to the wire harness is exposed outside of the cell monitor casing;
a power conversion unit configured to include a switching element and to perform conversion of output power of the fuel cell stack or conversion of supplied power to auxiliary machines used for operation of the fuel cell stack by using the switching element;
a housing configured to house therein the fuel cell stack, the cell monitor, and the power conversion unit, wherein the housing is configured to have four walls and an interior space surrounded by the four walls and wherein the housing is provided with a partition that divides the interior space into a first space in which the fuel cell stack is housed, and a second space in which the cell monitor casing is housed; and
a bulkhead part that is made of metal and is configured to partition the wire harness and the power conversion unit from each other, the bulkhead part being grounded, wherein
the wire harness and the power conversion unit are placed next to each other with the bulkhead part interposed therebetween,
the partition of the housing includes an opening,
the fuel cell stack and the cell monitor are connected by the wire harness passing through the opening in the partition, and
the fuel cell stack, the cell monitor, the wire harness, the power conversion unit, and the bulkhead part are disposed in the interior space of the housing.

13. The fuel cell unit in accordance with claim 12, wherein the cell monitor is spaced in a first direction from the fuel cell stack, and the bulkhead part is spaced in the first direction from the wire harness.

14. The fuel cell unit in accordance with claim 12, wherein the cell monitor is spaced in a first direction from the fuel cell stack, and the bulkhead part is spaced in between the wire harness and power conversion unit along a second direction that is perpendicular to the first direction.

* * * * *